Dec. 30, 1969 G. M. DARBY 3,486,628
SEDIMENTATION TANK WITH CENTER-PIER SUPPORTED
ROTATING RAKE STRUCTURE
Filed May 27, 1968 2 Sheets-Sheet 1
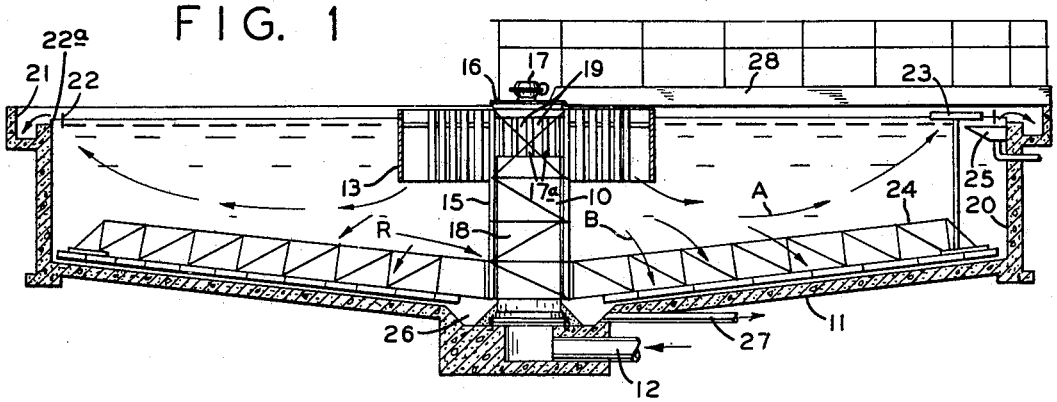
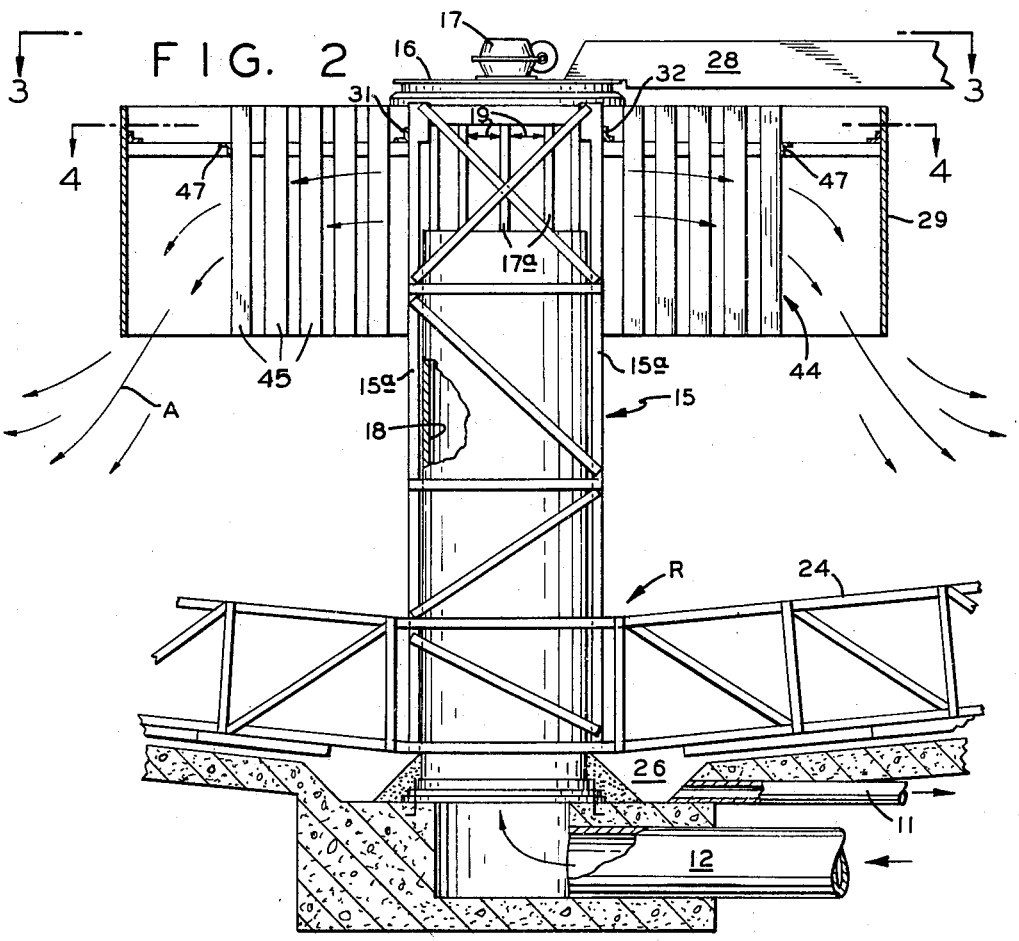
INVENTOR.
GEORGE M. DARBY
BY Theodore M. Jablon
ATTORNEY.

Dec. 30, 1969 G. M. DARBY 3,486,628
SEDIMENTATION TANK WITH CENTER-PIER SUPPORTED
ROTATING RAKE STRUCTURE
Filed May 27, 1968 2 Sheets-Sheet 2

INVENTOR.
GEORGE M. DARBY
BY Theodore M. Jablon
ATTORNEY.

United States Patent Office 3,486,628
Patented Dec. 30, 1969

3,486,628
SEDIMENTATION TANK WITH CENTER-PIER
SUPPORTED ROTATING RAKE STRUCTURE
George M. Darby, Stamford, Conn., assignor to Dorr-Oliver Incorporated, Stamford, Conn., a corporation of Delaware
Filed May 27, 1968, Ser. No. 732,297
Int. Cl. B01d 21/06
U.S. Cl. 210—520   14 Claims

ABSTRACT OF THE DISCLOSURE

Sedimentation tank featuring a feed well construction equipped with a special influent energy dispersing baffle system concentric with a rotary rake structure and surrounding a central feed supply.

---

This invention relates to sedimentation tanks having a rotating sediment raking structure, and more particularly means for improving the operation of the central feed well or feed well cylinder surrounding a central zone of feed influent supply, which in turn improves the sedimentation efficiency of the tank.

This invention is concerned with improving feed influent conditions known as "plunging" which may occur due to the influent streams impinging upon the surrounding feed well wall. Plunging tends to disturb a sedimentation pattern wherein it is desirable to have the influent streams directed more gently in shallow flow curves towards the peripheral overflow of the tank.

According to the invention, the feed influent conditions and thus the sedimentation efficiency of the tank are improved by the provision of novel and effective influent energy-consuming means interposed in the radial paths of the influent stream within the feed cylinder.

An energy dispersing baffle system according to this invention is simple and readily applicable to existing tank installations, comprising an assembly of vertical swirl producing baffle members spaced from one another about the vertical axis of the rake structure.

The invention is preferably applicable to, and herein illustrated as embodied in a sedimentation tank wherein a sediment raking structure is supported for rotation upon a center pier, with drive means which may also be mounted upon the pier. The rake structure has rake arms extending horizontally from a central vertical cage portion which surrounds the center pier, and is supported by annular bearing atop the pier, allowing the rake structure as a whole to be rotated about the vertical axis of the pier. A cylindrical feed well surrounds the upper end portion of the cage structure, which may be supported from a stationary structure such as the center pier or from a bridge, or else it may be mounted upon and carried by the rake structure itself to rotate unitary therewith.

The energy dispersing system according to a preferred embodiment comprises an assembly of vertical baffle elements resembling a picket fence surrounding the cage portion of the rake structure, and thus interposed in the path of the streams of feed suspension emanating from the influent delivery area or openings in the top end portion of the pier.

The baffle elements of this energy dispersing system or structure are of a cross-sectional configuration such that the passage of the influent liquid therethrough will generate suitably energy absorbing swirls. Hence, in their preferred form these elements are vertically extending angle irons spaced from one another around the cage portion of the rake structure, and with their vertical apex ridges pointing inwardly towards the pier. As the liquid passes between the converging side faces of the flow passages formed by these angle irons, swirls are created in the liquid streams past the narrow end of the passages, said swirls occupying the outwardly facing dead spaces between the shanks of the angle profile of the angle irons.

Sections of this picket fence baffle structure may be mounted conveniently in existing tank installations, and be readily supported from existing structure.

Other features and advantages will hereinafter appear.

FIG. 1 is a semi-diagrammatic vertical sectional view of a settling tank with bottom feed, embodying the improved feed well construction.

FIG. 2 is a greatly enlarged view taken from FIG. 1, of the central part of the rake structure supported by the center pier, with surrounding feed well structure featuring an energy-dispersing feed well construction.

Figure 3:
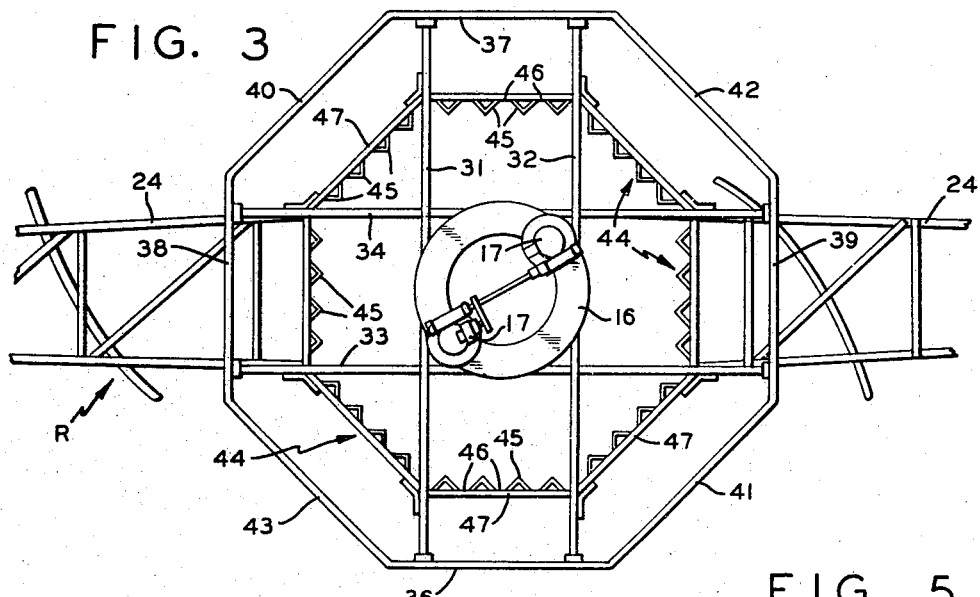
FIG. 3 is a top view taken on line 3—3 in FIG. 2 more clearly showing the arrangement of the feed well construction.

According to the example shown in FIG. 1, a suitable type of settling tank embodying this invention has a hollow center pier 10 rising from the tank bottom 11 and supporting a rotary rake structure R. The hollow pier has its lower end connected to an underground feed conduit 12 which supplies the feed suspension. From the top end portion of the pier the feed suspension passes through a surrounding feed well cylinder 13 which in this example is mounted upon and supported by the central vertical cage portion 15 of the rake structure, having four vertical corner members 15a.

A drive head 16 which may be of a standard construction atop the pier has bearing means supporting the rake structure for rotation, and drive means indicated by a motor drive unit 17.

The drive head is shown supported on vertical posts or columns 17a rising from the cylindrical portion 18 of the pier, which posts between them provide influent openings 19 for the feed suspension.

The peripheral wall 20 of the tank is shown to have a peripheral overflow launder 21 provided with scum baffle 22 concentric with, and spaced inwardly from the overflow weir 22a. The scum baffle cooperates with a skimmer 23 which may be of some conventional construction, carried by one of the rake arms 24 of the rake structure. Thus with the rotation of the rake structure scum is moved by the skimmer along the peripheral baffle into a scum discharge receptacle 25.

While clarified liquid overflows at the peripheral weir, the rake structure moves settled solids over the tank bottom into an annular sump 26 surrounding the foot-end portion of the pier, for withdrawal through sludge discharge conduit 27. A customary bridge structure 28 provides access to the pier and to the mechanism supported thereby.

More specifically (see FIGS. 2, 3 and 4) in this example, a feed well cylinder 29 is of cross-sectional octagonal configuration supported on the cage portion 15. The support means for the feed well cylinder comprise a first pair of horizontal parallel beams 31 and 32 fixed to the corner members 15 of the cage, and a similar second pair of parallel beams 33 and 34 placed at right angles to the first pair of beams, and also fixed to the corner members of the rotating cage. The two pairs of support beams may extend within the feed well cylinder substantially in the same horizontal plane.

The ends of each pair of these support beams may be fixed to respective wall portions of the feed well cylinder, such connections being indicated at 35. Accordingly, the first pair of beams is connected to parallel wall portions 36 and 37, while the second pair of beams is connected to parallel wall portions 38 and 39 of the octagonal feed well cylinder. The cylinder further comprises one pair of complementary parallel wall portions 40 and 41 and another pair of complementary wall portions 42 and 43, completing the octagonal shape.

The support structure or support beams for the feed well cylinder may be utilized to support a supplemental influent energy dispersing baffle structure 44 substantially conforming to the octagonal shape of the surrounding feed well cylinder, and composed mainly of vertical baffle elements 45 spaced from one another around the cage portion of the rake structure, so as to provide between them vertically extending passage openings 46 interposed in the path of the influent suspension emanating radially in all directions from influent openings 19 of the pier.

The vertical baffle elements and the flow passages formed thereby are so shaped as to effectively disperse or consume the influent energy, thus minimizing or eliminating any tendency of the influent liquid to "plunge" and thereby upset a desired sedimentation pattern. Rather, due to energy dispersal thus attainable, the sedimentation pattern will substantially follow the shallower flow lines indicated by arrows A, with arrows B indicating paths of solids settling to the tank bottom.

Accordingly, the baffle elements are preferably in the form of vertical members of angular cross-sectional configuration, such as vertical angle irons with their apex or ridge pointing radially inwardly towards the vertical axis of the pier. In this way, the baffle elements constitute vertically extending flow passages defined by the converging sides 45a and 45b of mutually adjoining baffle members. The passages (see FIG. 5) thus have a wider influent width $d$–1 and a narrower effluent width $d$–2.

Figure 4:
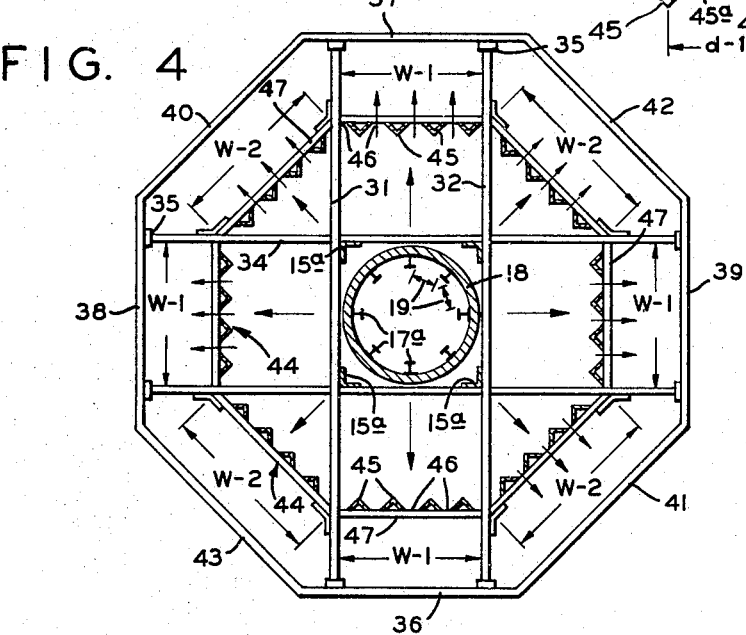
FIG. 4 is a cross-sectional view taken on line 4—4 in FIG. 2 clearly showing the arrangement of the energy dispersing elements.

In the practical embodiment illustrated in FIGS. 3 and 4, the energy dispering baffle system is readily applicable to an existing installation. Accordingly, this baffle system comprises panel sections of width W–1 and W–2, which may be individually fixed to respective horizontal beam members supporting the feed well cylinder above described. Each panel section comprises a horizontal tie member 47 to which the vertical baffle members or angle irons are fixed suitably spaced from one another.

Figure 5:
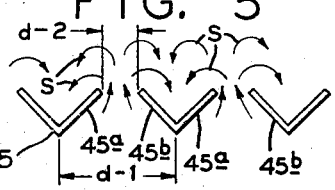
FIG. 5 is an enlarged cross-sectional detail view of the energy dispersing feed well elements.

FIGS. 4 and 5 further explain the energy-dispersing effect of this baffle system by indicating swirls S induced at the effluent side of flow passages, and in the dead spaces between the shanks constituting the respective vertical angle irons.

Although in FIGS. 1 and 2 the vertical baffle elements 45 are shown to terminate downwardly in the horizontal plane defined by the bottom edge of the feed well cylinder, it should be understood that they may terminate a suitable distance below or above that plane. Means may be provided for vertically adjusting these elements. Furthermore, the energy-dispersing baffle means may comprise additional baffle structure associated with the one shown. For example, an additional similar picket fence baffle structure may be located either inside or outside the one shown, substantially concentric therewith.

It will be understood that each of the elements, or two or more together, of the apparatus herein described, may also find useful application in other types of sedimentation apparatus differing from the type described above.

Furthermore, while the invention has been illustrated and described in connection with a pier-supported sediment raking apparatus with bottom feed into the hollow pier, the invention is not intended to be limited to the details shown, since various modifications and structural changes may be made without departing from the spirit of the present invention.

What is claimed is:

1. In a sedimentation tank the combination which comprises a hollow center pier adapted to have a feed suspension rising therein, supplied from below through the tank bottom, and delivered from the top end portion as influent streams radially in all directions,
   a rake structure having a vertical cage portion surrounding said pier, with rake arms extending from said cage portion,
   bearing means supporting said cage portion for rotation of the rake structure about said pier,
   a feed well cylinder surrounding said cage portion,
   and an influent energy dispersing baffle structure surrounding said cage portions, and interposed in the path of said influent streams within said feed well cylinder, said baffle structure comprising an assembly of substantially vertically elongated baffle elements spaced from one another around said cage portion, so as to form vertically elongated throughflow passages, said elements being so constructed and arranged that the influent energy of the streams flowing through said passages is subject to energy consuming swirls,
   and support structure for sustaining said feed well cylinder and said baffle structure substantially concentric to each other as well as relative to the axis of rotation of said rake structure.

2. The combination according to claim 1, wherein both said feed well cylinder and said baffle structure are supported by said rake structure.

3. The combination according to claim 1, wherein said vertically elongated baffle elements are in the form of angle profiles arranged with their apex ridges pointing inwardly.

4. The combination according to claim 1, wherein said support structure comprises horizontal support beam members fastened to said cage portion, and wherein said baffle structure is fastened to said horizontal members.

5. The combination according to claim 1, wherein said baffle structure is of polygonal shape.

6. The combination according to claim 1, wherein said baffle structure is composed of vertically planar panel sections in such a manner as to constitute a polygonal cage construction.

7. The combination according to claim 1, wherein said support structure comprises a first pair of horizontal parallel beam members fastened to respective opposite sides of said cage portion, and a second pair of horizontal parallel beam members disposed at right angles to said first pair of beam members, and fastened to respective opposite sides of said cage portion, and wherein said baffle structure is supported by said pairs of beam members, comprising a first pair of vertical panel sections extending opposite each other between said first pair of beam members, a second pair of panel members extending opposite each other between said second pair of beam members,
   a third pair of panel members extending opposite each other between said first and second pairs of beam members,
   and a fourth pair of panel members extending opposite each other between said first and second pairs of beam members, and complementary to all said other panel members so as to constitute therewith an octagonal cage construction.

8. The combination according to claim 7, wherein said cage portion of the rake structure is of square cross-sectional configuration, and wherein said pairs of parallel beam members are fastened to respective sides of said square configuration.

9. In a sedimentation tank the combination which comprises a center pier, a rake structure having a vertical cage surrounding the pier, which cage has an open upper end portion, with rake arms extending from said cage, bearing means supporting said cage for rotation of the rake structure about said pier, a feed well cylinder surrounding said open upper end portion of the cage, supported substantially concentric therewith, an upflow supply conduit for feed suspension, concentric with said cage and with said pier, said conduit extending upwardly to a height where the upper end portion thereof is surrounded by the lower end portion of said feed well cylinder, and adapted to have feed suspension rising therein, supplied from below through the tank bottom, and delivered therefrom as influent radially in all directions through said open upper end portion of the cage into the space defined by the surrounding feed well cylinder, and an influent energy dispersing baffle structure surrounding said upper end portion of the cage and spaced radially outwardly therefrom, and supported substantially concentric therewith, and interposed in the path of said influent suspension within said feed well cylinder, said baffle structure comprising an assembly of substantially vertically elongated baffle elements spaced from one another around said cage, so as to form vertically elongated throughflow passages, said elements being so constructed and arranged that the influent energy of the feed suspension flowing through said passages is subject to energy consuming swirls.

10. The combination according to claim 9, wherein said vertically elongated baffle elements are in the form of angle profiles arranged with their apex ridges pointing inwardly.

11. The combination according to claim 10, wherein both said feed well cylinder and said vertical baffle elements are supported by a common horizontal frame structure.

12. The combination according to claim 11, wherein said common supporting frame structure comprises an assembly of horizontal transverse beams endwise connected to the walls of the feed well cylinder, and wherein said vertical baffle elements are connected to said beams.

13. The combination according to claim 11, wherein the vertically elongated passages between the baffle elements are open at the lower end.

14. The apparatus according to claim 9 wherein both said feed well cylinder and said baffle structure are supported by said rake structure so as to rotate unitary therewith.

References Cited

UNITED STATES PATENTS 2,236,434   3/1941   Knowles _____ 210—528

JAMES L. DE CESARE, Primary Examiner

U.S. Cl. X.R.

210—525, 528